United States Patent [19]

Wendler

[11] Patent Number: 5,311,279
[45] Date of Patent: May 10, 1994

[54] INTEGRATED OPTICAL APPARATUS FOR THE INTERFEROMETRIC MEASUREMENT OF LIGHT WAVES

[75] Inventor: Martin Wendler, Freiburg, Fed. Rep. of Germany

[73] Assignee: Litef GmbH, Freiburg im Breisgau, Fed. Rep. of Germany

[21] Appl. No.: 976,643

[22] Filed: Nov. 12, 1992

Related U.S. Application Data

[63] Continuation of Ser. No. 710,702, Jun. 5, 1991, abandoned.

[30] Foreign Application Priority Data

Jun. 7, 1990 [EP] European Pat. Off. ............ 90110835

[51] Int. Cl.$^5$ ................................................ G01B 9/02
[52] U.S. Cl. ........................ 356/345; 356/358; 356/45; 385/14; 385/129; 385/131
[58] Field of Search ............... 356/345, 358, 4.5; 385/14, 129, 130, 131, 132

[56] References Cited

U.S. PATENT DOCUMENTS

| | | | |
|---|---|---|---|
| 4,515,430 | 5/1985 | Johnson | 350/96.13 |
| 4,753,529 | 6/1988 | Layton | 356/345 |
| 4,865,453 | 9/1989 | Gidon et al. | 356/358 |
| 4,923,594 | 7/1990 | Pavlath | 356/345 |

FOREIGN PATENT DOCUMENTS 2201256 8/1988 United Kingdom .

Primary Examiner—Samuel A. Turner
Assistant Examiner—LaCharles Keesee
Attorney, Agent, or Firm—Elliott N. Kramsky

[57] ABSTRACT

Apparatus for measurement of light waves with an unbalanced optical interferometer. The apparatus consists of waveguides on a flat substrate material characterized by direction-dependent thermal expansion. Thermal compensation is achieved without active regulation by a predetermined spatial arrangement and length ratio of the light paths so that the optical lengths of the two waveguides change by precisely the same amount. As a result, the optical path difference is independent of temperature changes.

9 Claims, 2 Drawing Sheets

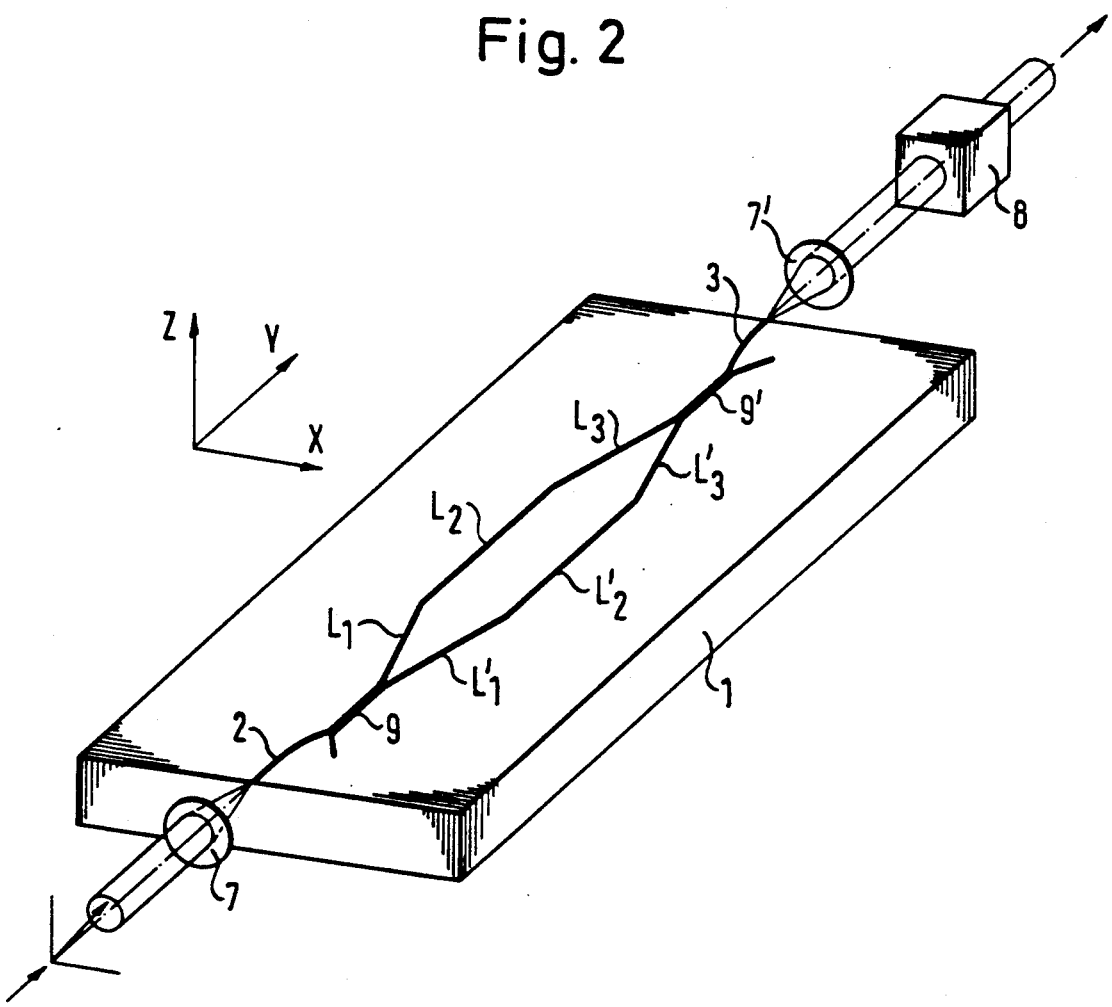

INTEGRATED OPTICAL APPARATUS FOR THE INTERFEROMETRIC MEASUREMENT OF LIGHT WAVES

This application is a continuation of application Ser. No. 710/702, filed Jun. 5, 1991, now abandoned.

BACKGROUND

1. Field of the Invention

The present invention relates to apparatus for the interferometric measurement of light waves. More particularly, the invention pertains to apparatus of such sort fabricated in integrated optics on an anisotropic substrate.

2. Description of the Prior Art

Unbalanced optical interferometers comprise devices in which a light beam is split into at least two partial light beams. After the beams traverse defined, unequal paths, they are recombined into a single beam. As a result of interference, the intensity of the recombined beam is a function of the phase difference between the two partial light beams. Unbalanced interferometers are employed, for example, for light source wavelength stabilization, wavelength measurement, frequency analysis of light and demodulation of frequency-modulated optical signals.

A prerequisite for proper operation of such a device is maintenance of the selected optical path difference (determined as refractive index x path difference). Specifically, length and refractive index changes due to temperature change must not influence the optical path difference. In this regard, it is known to temperature-control the interferometer (that is, to actively control the temperature) to maintain it at the same temperature at all times. It is also known to construct beam-optical interferometers entirely of material of extremely low thermal expansion qualities such as Zerodur.

Current research is devoted to miniaturization and integration of optical and optoelectronic components. In integrated optics components, the light is guided in waveguides, modulated, superposed and detected. The structures consisting of waveguides and electrodes are applied to the surface of transparent substrates such as lithium niobate, various semiconductors, glass and garnet. Most of the materials employed in integrated optics (IO) are synthetic monocrystals. In such materials, thermal expansion and the thermal change of refractive index are non-negligible and of differing magnitudes in the various crystal directions. Accordingly, it has not been possible to construct an unbalanced, temperature-compensated interferometer in integrated optics by employing known, conventional techniques. Temperature control of the component is indeed conceivable; however, in most applications, it is not practicable due to the required energy consumption and the required broad temperature range.

SUMMARY AND OBJECTS OF THE INVENTION

It is, therefore, an object of the present invention to provide an integrated optic device for interferometric measurement of light waves without active regulation for thermal compensation.

It is another object of the invention to achieve the above object by means of a device in which an optical path difference, once set, does not change over a relatively large temperature range.

The present invention addresses the foregoing objects by providing apparatus for interferometric measurement of light waves formed in integrated optics on an anisotropic substrate. Such apparatus includes a pair of light paths for receiving an input light beam. The light paths are of differing optical path lengths. The directions of the light paths are selected with respect to the crystal axes of the substrate, their path lengths and the direction of polarization of the input light beam so that the optical path length difference is unaffected by temperature changes.

The foregoing and other features and advantages of this invention will become further apparent from the detailed description that follows. Such description is accompanied by a set of drawing figures. Numerals of the drawing figures, corresponding to those of the written description, point to the features of the invention, like numerals referring to like features throughout.

BRIEF DESCRIPTION OF THE DRAWINGS

FIG. 2 is a perspective view of a Mach-Zehnder interferometer in integrated optics in which the injected light is apportioned to two waveguides at a coupler and, after traversing separate paths, is combined at a second coupler.

DETAILED DESCRIPTION

Figure 1:
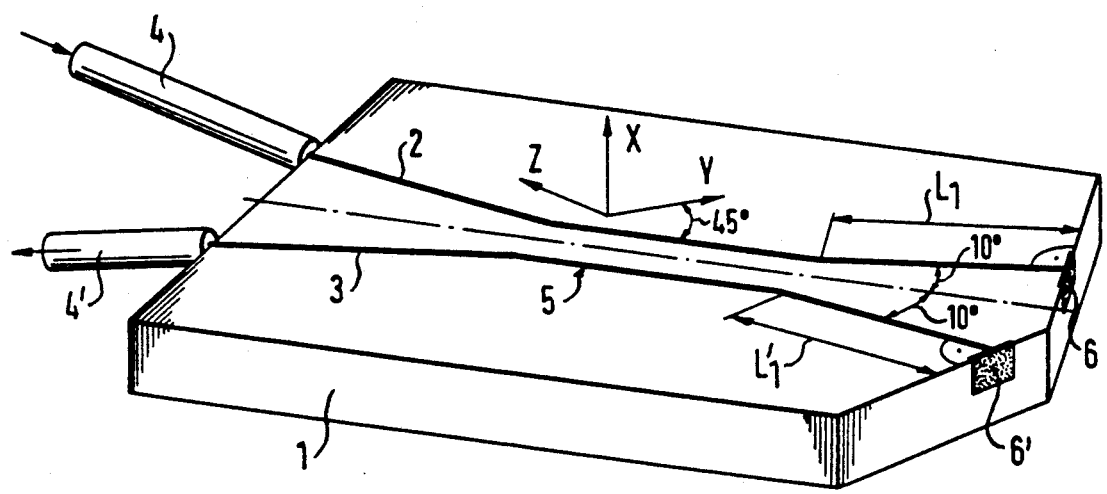
FIG. 1 is a perspective view of a Michelson interferometer in integrated optics with a single coupler and two waveguide segments with mirror-coated open ends.

FIG. 1 is a perspective view of a Michelson interferometer formed in integrated optics with a single coupler and two waveguide segments with mirror-coated open ends.

The Michelson interferometer of FIG. 1 serves to assist the further explanation of the basic concept without restricting the range of possible application of the invention. As shown, it includes titanium-endiffused monomode waveguides on an X-cut $LiNbO_3$ substrate 1. Entrance and exit waveguides 2 and 3 respectively are connected via an fiber-optical connection 4 to a light source (not shown) of, e.g. 830 nm wavelength and, via an fiber-optical connection 4' to a detector (not shown).

X-polarized light, for example, is partially coupled over from the entrance waveguide 2 to the exit waveguide in a coupling region 5. The two waveguides 2, 3 are closed off with reflecting coatings 6 and 6' at the substrate end remote from the coupling region 5.

The light from the two waveguides reflected back by the coatings 6, 6' interferes within the coupling region 5. Depending upon the phase difference, the light is passed more into the waveguide 2 or the waveguide 3. The intensity signal produced therefrom passes via the fiber-optical connection 4' to the detector.

The phase relation within the coupling region is determined by the difference of the paths $L_1$ and $L_1'$ between the coupling region 5 and the reflecting coatings 6, 6', respectively (the path difference $L_1 - L_1'$), the refractive index n along the waveguides and the wavelength of the light. The $LiNbO_3$ crystal expands thermally in the Y direction with twice the magnitude as in the Z direction. on the other hand, the refractive index n in the case of X polarization changes with equal magnitude in the two optical paths $L_1$, $L_1'$.

If, for example, as shown in the drawing, the deviation of the two paths $L_1$ and $L_1'$ from 45° with respect to the Y axis is selected to be ±10°, then the following absolute values occur:

| Coefficient of thermal expansion | Thermal change of the refractive index | Angle between waveguide and Y axis |
|---|---|---|
| $L_1 : a_1 = 12.8 \cdot 10^{-6}$ | $d = 1.17 \cdot 10^{-6}$ | $\theta_1 = 35°$ |
| $L_1' : a_1' = 10.1 \cdot 10^{-6}$ | $d = 1.17 \cdot 10^{-6}$ | $\theta_1' = 55°$ |

If the quantities $L_1 \cdot n$ and $L_1' \cdot n$ change in absolute terms by the same amount $\delta$ in the vent of a temperature change, then the optical path differences $L_1 \cdot n - L_1' \cdot n$ remains constant. The following then applies:

$$L_1 \cdot n - L_1' \cdot n = (L_1 \cdot n + \delta) - (L_1' \cdot n + \delta)$$
$$(L_1 - L_1') \cdot n = (L_1 - L_1') \cdot n$$

For the thermal change of the optical path, the following are then applicable to the first approximation:

$$\delta(T) = L \cdot n(a + d) \cdot T \rightarrow$$

$$L_1 \cdot n(a_{1(\theta 1)} + d) \cdot T = L_1' \cdot n(a_{1'(\theta 1')} + d) \cdot T$$

$$\frac{L_1}{L_1'} = \frac{(a_1' + d)}{(a_1 + d)} = \frac{11,8 \cdot 10^{-6}}{14,5 \cdot 10^{-6}}$$

$$\frac{L_1}{L_1'} = 0{,}8138$$

This example illustrates only one of many possible designs within the scope of the invention.

In principle, the direction of polarization of the light, the crystal cut of the substrate (i.e. wafer disc), the direction of propagation of light and the type of interferometers are immaterial. It is almost always possible to solve the appropriate system of equations. The substrate material must merely be capable of producing waveguides thereon whose length and/or refractive index changes to differing extents in different (spatial) directions as a result of a temperature change. The extent of the theoretical description may differ from one case to another. The above example only illustrates the theoretical description appertaining to a simple case to provide an understanding of the principle.

For a more precise theoretical description of the invention, three important formulae are required: the angle dependence of the refractive index and its thermal change as well as the dependence of the coefficient of thermal expansion of the angle. The formulae and material constants required for this are known and can be found for all relevant materials in the pertinent literature. The refractive index $n(\theta)$, its thermal coefficient $d(\theta)$ and the coefficient of thermal expansion $a(\theta)$ are readily available.

This permits a statement of the fundamental equation which describes the equality of the thermal change of two optical paths. In this case, an interferometer may consist of any selectable number of straight partial sections, the sum of which describes the entire interferometer arm. In practice, each arm will consist of as few straight partial sections as possible.

$$\sum_{i=1}^{m} L_i n_{i(\theta i)} (a_{i(\theta i)} + d_{i(\theta i)}) = \sum_{k=1}^{n} L_k' \cdot n_{k(\theta k')}' (a_{k(\theta k')}' + d_{k(\theta k')}')$$

The desired optical path difference is determined as $$\sum_{i=1}^{m} L_i n_{i(\theta i)} - \sum_{k=1}^{n} L_k' n_{k(\theta k')}' = \Delta L$$

The prior art discloses two methods for splitting light utilizing integrated optics:
(1) Polarization-independent splitting (Y branch, directional coupler) occurs when the injected light intensity is apportioned to the two waveguides independent of its state of polarization. When using such couplers, it is helpful to employ light polarized parallel to a crystal principal axis.
(2) Polarization-dependent splitting (polarization-dependent directional couplers). In this case, the component of the injected light that is polarized perpendicular to the crystal's optical axis is coupled into one waveguide and the perpendicular thereto polarized light is coupled into the other waveguide. If light polarized at 45° to the crystal principal axis is injected into this type of coupler, then mutually perpendicularly polarized light propagates in the two interferometer arms.

Above all, two known types of interferometer constructed in integrated optics may be temperature-stabilized according to the invention.
(1) The Michelson interferometer consists of a single coupler and two waveguide segments which are mirror coated at their ends. The information signal is extracted at the same coupler at which the light is coupled in (see FIG. 1).
(2) In a Mach-Zehnder interferometer, the injected light is split at a coupler into two waveguides which traverse separate paths and is recombined at a second coupler. The desired interferometer signal is then available downstream of the second coupler (see FIG. 2).

The invention may be explained with reference to two materials of differing thermal expansions and lengths. In the case of a determined length ratio the materials expand precisely by the same amount. Accordingly, the absolute length difference will remain constant.

The invention makes use of one of two physical facts: known anisotropic materials expand thermally to different extents in different spatial directions and in known anisotropic materials the refractive indices appertaining to the different directions of light polarization change thermally to different extents in predetermined directions of optical propagation. Furthermore, it is possible to combine these two anisotropic material effects.

Accordingly, the invention provides an integrated-optics interferometer with optically unequally long arms or paths on a substrate material subject to temperature-specified direction-dependent length changes and-/or refractive index changes, so that thermal compensation without active regulation is achieved by controlled utilization of these differing coefficients.

If the two arms or light paths of a balanced interferometer take the form of two equally long waveguides on the surface of an IO substrate with direction-dependent thermal expansion, then the optical path length changes will occur to differing extents. In such circumstances, even a balanced interferometer can never be maintained thermally stable. When, according to the invention, the arms or path lengths are of differing lengths, then it becomes clear that, for a given length ratio, the optical path difference does not change with temperature. This occurs when the optical lengths of the two waveguides change by precisely the same amount.

For actual realization, three fundamental possibilities exist:

FIRST PRINCIPLE

The direction of polarization of the injected light is selected so that the thermal change of the refractive index is of equal magnitude in all light paths. Accordingly, the two interferometer arms are distinguished only with respect to their coefficients of thermal expansion, while the refractive index and its thermal dependence are the same in both arms. Therefore, a crystal wafer is required with the polar axis parallel to the surface (X or Y cut). The polarization of the light must be perpendicular to the optical axis in each waveguide.

In this case, the principal equation is of the following form:

$$\sum_{i=1}^{n} L_i\, n(\alpha_{i(\theta i)} + d) = \sum_{k=1}^{m} L_{k'}\, n\,(\alpha'_{k(\theta k')} + d)$$

Both types of interferometer may be constructed in accordance with this principle. The example of FIG. 1 shows a Michelson interferometer with a polarization-independent coupler and, one waveguide segment per arm, which is operating in accordance with this principle.

SECOND PRINCIPLE

The coupling region between the light paths is designed so that light of mutually-perpendicular directions of polarization propagates in the two light paths. As a result of this, the thermal change of the refractive index is of different magnitude for different directions of propagation. That is, only the refractive index and the thermal change thereof differ between the two arms. On the other hand, the thermal expansions are identical for the two arms. Therefore, a crystal wafer is required which is cut so that the coefficient of thermal expansion is equal in all directions parallel to the surface. In this case, the polar axis is perpendicular to the surface (Z cut). The directions of polarization of the light in the two waveguides must extend perpendicular to one another, requiring the use of a polarization-dependent coupler.

In these circumstances, the principal equation is of the following form:

$$\sum_{i=1}^{m} L_i\, n(\alpha + d) = \sum_{k=1}^{n} L_{k'}\, n'\,(\alpha + d')$$

Both types of interferometer may be construed using this principle.

FIG. 2 is a perspective view of a Mach-Zehnder interferometer in integrated optics in which the injected light is apportioned to two waveguides at a coupler and, after traversing separate paths, is combined at a second coupler. In the example of FIG. 2, the Mach-Zehnder interferometer, having three straight waveguide segments per each arm, operates in accordance with this second principle. The interferometer includes titaniumin-diffused monomode waveguides on a Z-cut LiNbO₃ substrate 1. Light polarized at 45° to the substrate surface is injected via a lens 7 into the entrance waveguide 2 using beam optics. Again, using beam optics, the light is passed from the exit waveguide 3 via a further lens 7' and the polarizer 8 to a detector (not shown). A coupler 9 is designed so that light polarized parallel to the surface is passed into the interferometer arm consisting of the straight waveguide segments $L_1$, $L_2$ and $L_3$. Perpendicular thereto polarized light is passed into the other interferometer arm consisting of the straight waveguide segments $L_1'$, $L_2'$ and $L_3'$. The light from the two arms is recombined at a further coupler 9' and conducted into the exit waveguide 3.

The direction of polarization of the recombined light is a function of the phase difference between the two directions of polarization and, thus of the difference in length between the two arms. The polarization direction is converted into intensity information by the polarizer.

At a light wavelength of, for example, 830 nm, the following values emerge:

| Coefficient of thermal expansion | Refractive index | Thermal change of the refractive index |
|---|---|---|
| L:$\alpha = 15.4 \cdot 10^{-6}$ | n = 2.252 | d = 1.7 · 10⁻⁶ |
| L:$\alpha' = 15.4 \cdot 10^{-6}$ | n' = 2.172 | d' = 20 · 10⁻⁶ |

$$\sum_{i=1}^{3} L_i\, n\,(\alpha + d) = \sum_{k=1}^{3} L'_k\, n'(\alpha + d')$$

$$\frac{L_1 + L_2 + L_3}{L'_1 + L'_2 + L'_3} = \frac{n' \cdot (\alpha + d')}{n \cdot (\alpha + d)} = \frac{2{,}172 \cdot (15{,}4 + 20) \cdot 10^{-6}}{2{,}252 \cdot (15{,}4 + 1{,}7) \cdot 10^{-6}}$$

$$\frac{L}{L'} = 1{,}9966$$

THIRD PRINCIPLE

The polarization of the injected light is so chosen that the thermal change of the refractive index differes in magnitude for different directions of propagation. In other words, both the refractive index and the thermal change thereof and also the thermal expansion differ in the two interferometer arms. Therefore, a crystal wafer is required whose polar axis is parallel to the surface (X or Y cut). The thermal expansion must be parallel to the surface in at least one interferometer arm.

The principal equation has the following form:

$$\sum_{i=1}^{m} L_i\, n_{i(\theta i)} \cdot (\alpha_{i(\theta i)} + d_{i(\theta i)}) = \sum_{k=1}^{n} L_{k'}\, n'_{k(\theta k')} \cdot (\alpha'_{k(\theta k')} + d'_{k(\theta k')})$$

Both types of interferometer may be constructed in accordance with this principle.

Thus it is seen that the present invention provides an integrated optics device for interferometric measurement of light waves that does not require active regulation of thermal compensation. Furthermore, the invention achieves this highly-desirable result with a device in which an optical path difference, once set, does not change over a relatively-large temperature range.

While this invention has been described with reference to its presently-preferred embodiment, it is not limited thereto. Rather, this invention is limited only insofar as it is defined by the following set of patent claims and includes within its scope all equivalents thereof.

REFERENCES (1) Armin Räuber: "Chemistry and Physics of Lithium Niobate", Current Topics in materials science, vol. I, Chapter 7, Ed. E. Kaldis, North-Holland Publishing Company 1978.

(2) "Guided-Wave optoelectronics", Ed. T. Tamir, Springer-Verlag Berlin, Heidelberg, New York, London, Paris, Tokyo, 1988.

What is claimed is:

1. An interferometer with temperature invariant optical path length difference formed in integrated optics on an anisotropic substrate comprising, in combination:
   a) a pair of monomode waveguides for receiving an input light beam, said waveguides being of differing optical path lengths;
   b) the directions of said waveguides being selected with respect to the crystal axes of said substrate, their path lengths and the direction of polarization of said input light beam so that the optical length difference is unaffected by temperature changes; and
   c) the geometric positions of said light paths and their lengths are chosen with regard to the anisotropic material effect of different coefficients of thermal expansion in different spatial directions of said substrate.

2. An interferometer with temperature invariant optical path length difference formed in integrated optics on an anisotropic substrate comprising, in combination:
   a) a pair of monomode waveguides for receiving an input light beam, said waveguides being of differing optical path lengths;
   b) the directions of said waveguides being selected with respect to the crystal axes of said substrate, their path lengths and the direction of polarization of said input light beam so that the optical length difference is unaffected by temperature changes; and
   c) the geometric positions of said light paths and their lengths are chosen with regard to the anisotropic material effect of different thermal changes of refractive indices in different spatial directions of said substrate.

3. An interferometer with temperature invariant optical path length difference formed in integrated optics on an anisotropic substrate comprising, in combination:
   a) a pair of monomode waveguides for receiving an input light beam, said waveguides being of differing optical path lengths;
   b) the directions of said waveguides being selected with respect to the crystal axes of said substrate, their path lengths and the direction of polarization of said input light beam so that the optical length difference is unaffected by temperature changes; and
   c) the geometric positions of said light paths and their lengths are chosen with regard to the anisotropic material effect of different coefficients of thermal expansion in different spatial directions of the substrate and the anisotropic material effect of differing thermal changes of refractive indices in different spatial directions of said substrate.

4. An interferometer as defined in claim 1 comprising a Michelson interferometer.

5. An interferometer as defined in claim 1 comprising a Mach-Zehnder interferometer.

6. An interferometer as defined in claim 2 comprising a Michelson interferometer.

7. An interferometer as defined in claim 2 comprising a Mach-Zehnder interferometer.

8. An interferometer as defined in claim comprising a Michelson interferometer.

9. An interferometer as defined in claim comprising a Mach-Zehnder interferometer.

* * * * *